(12) United States Patent
Peachey-Kountz et al.

(10) Patent No.: US 6,463,345 B1
(45) Date of Patent: Oct. 8, 2002

(54) REGENERATIVE AVAILABLE TO PROMISE

(75) Inventors: Penny Jeanette Peachey-Kountz, South Burlington; Robert Eugene Rice, Essex Junction, both of VT (US); Geetaram Savlaram Dangat, Naperville, IL (US); Rahul Jindani; Rahul Nahar, both of South Burlington, VT (US); Srinivasa Govinda Kuthethur, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,150

(22) Filed: Jan. 4, 1999

(51) Int. Cl.[7] ............................................... G06F 19/00
(52) U.S. Cl. ........................ 700/99; 700/106; 705/28
(58) Field of Search ........................ 700/99, 106, 107; 705/10, 22, 28, 29

(56) References Cited

U.S. PATENT DOCUMENTS

| | | | | |
|---|---|---|---|---|
| 5,440,480 A | * | 8/1995 | Costanza | 705/8 |
| 5,548,518 A | | 8/1996 | Dietrich et al. | 700/100 |
| 5,630,123 A | * | 5/1997 | Hogge | 707/7 |
| 5,712,989 A | * | 1/1998 | Johnson et al. | 705/28 |
| 5,758,329 A | * | 5/1998 | Wojcik et al. | 705/28 |
| 5,943,484 A | * | 8/1999 | Milne et al. | 700/100 |
| 5,971,585 A | * | 10/1999 | Dangat et al. | 700/102 |
| 6,006,196 A | * | 12/1999 | Feigin et al. | 705/10 |
| 6,049,742 A | * | 4/2000 | Milne et al. | 700/99 |
| 6,088,626 A | * | 7/2000 | Lilly et al. | 700/100 |
| 6,272,389 B1 | * | 8/2001 | Dietrich | 700/101 |
| 6,324,522 B2 | * | 11/2001 | Peterson et al. | 705/28 |
| 6,332,130 B1 | * | 12/2001 | Notani et al. | 705/28 |
| 6,341,269 B1 | * | 1/2002 | Dulaney et al. | 705/22 |
| 6,341,271 B1 | * | 1/2002 | Salvo et al. | 705/28 |
| 6,343,238 B1 | * | 1/2002 | Kudo | 700/108 |

OTHER PUBLICATIONS

Lankford, R. "Scheduling the Job Shop," Proceedings of the Sixteenth Annual Conference of the American Production and Inventory Control Society. (1973).

Lankford, R. "Short–Term Planning of Manufacturing Capacity," Proceedings of the Twenty–First Annual Conference of the American Production and Inventory Control Society. (1978).

* cited by examiner

Primary Examiner—Leo Picard
Assistant Examiner—Paul Rodriguez
(74) Attorney, Agent, or Firm—McGuireWoods LLP; Richard Kotulak, Esq.

(57) ABSTRACT

A computer implemented Availability Checking Tool enabling tool users to execute within a common work environment, from common enterprise data, and considering assets and demands across multiple order management systems and manufacturing facilities within boundaries established by manufacturing specifications and process flows and business policies. The tool receives orders from multiple demand sources or ordering systems. Tool users can easily maintain a synergistic relationship between multiple ordering systems. A demand configurator coordinates product requests based on information from the demand source according to certain rules and priorities assigned to the product requests. A material resource engine manipulates data from the demand configurator and the rules to provide material supply information. A solver manipulates the material supply information from the resource engine and the rules to provide optimized product availability information. Thus, customer business rule level definitions are supported to provide the tool users with the power to micro-manage, optimally, enterprise assets and demands.

17 Claims, 6 Drawing Sheets

SUPPLY LINE

| PERIOD 1 | PERIOD 2 | PERIOD 3 | PERIOD 4 | PERIOD 5 | ~50 |
|---|---|---|---|---|---|
| 100 | 100 | 100 | 100 | 100 | |

DEMAND

| PERIOD 1 | PERIOD 2 | PERIOD 3 | PERIOD 4 | PERIOD 5 | ~52 |
|---|---|---|---|---|---|
| | 300 | | | | |

AVAILABLE TO PROMISE

| PERIOD 1 | PERIOD 2 | PERIOD 3 | PERIOD 4 | PERIOD 5 | ~54 |
|---|---|---|---|---|---|
| 0 | 0 | 0 | 100 | 100 | |

FIG.1  PRIOR ART

| | DEMAND TYPE | DEMAND CLASS |
|---|---|---|
| 1 | BACKORDER | 1 |
| 2 | FIRM ORDER | 2 |
| 3 | ORDER MOVE-IN | 3 |
| 4 | ORDER MOVE-OUT | 4 |
| 5 | NEW REQUEST | 6 |
| 6 | UNSATISFIED REQUEST | 6 |
| 7 | FORECAST | 9 |

FIG.3

SUPPLY LINE

| PERIOD 1 | PERIOD 2 | PERIOD 3 | PERIOD 4 | PERIOD 5 |
|---|---|---|---|---|
| 100 | 100 | 100 | 100 | 100 |

60

ALLOCATION

| FORECAST GROUP | PERIOD 1 | PERIOD 2 | PERIOD 3 | PERIOD 4 | PERIOD 5 |
|---|---|---|---|---|---|
| FORECAST GROUP 1 | 20 | 20 | 50 | 50 | 20 |
| FORECAST GROUP 2 | 80 | 80 | 50 | 50 | 80 |

62

DEMAND

| FORECAST GROUP | PERIOD 1 | PERIOD 2 | PERIOD 3 | PERIOD 4 | PERIOD 5 |
|---|---|---|---|---|---|
| FORECAST GROUP 2 |  | 300 |  |  |  |

64

PROFIT ATP

| FORECAST GROUP | PERIOD 1 | PERIOD 2 | PERIOD 3 | PERIOD 4 | PERIOD 5 |
|---|---|---|---|---|---|
| FORECAST GROUP 1 | 20 | 20 | 50 | 50 | 20 |
| FORECAST GROUP 2 | 0 | 0 | 0 | 0 | 40 |

| DATA ELEMENTS FOR FROZEN PARAMETERS FILE ||||||
|---|---|---|---|---|---|
| ELEMENT | KEY | REQ/OPT. | LENGTH | DESCRIPTION | NOTES |
| PHYLUM | YES | OPT | 6 | | EITHER PHYLUM OR P/N IS REQUIRED |
| FAMILY | YES | OPT | 6 | | |
| GENUS | YES | OPT | 6 | | |
| SPECIES | YES | OPT | 6 | | |
| P/N | YES | OPT | 12 | | |
| ORDER_LOC | YES | REQ | 4 | | |
| SUP_LOC | YES | OPT | 4 | | IF BLANK, APPLIES TO ALL SUP_LOCS |
| FRZ_IN | NO | REQ | 3 | NO NEW ORDER OR ALTERATIONS ALLOWED DUE BEFORE MIMIIN.PLANDATE PLUS FRZ_IN | |
| FRZ_OUT | NO | REQ | 3 | NO ALTERATIONS OUT FOR ORDERS CURRENTLY DUE WITHIN MIMIIN.PLANDATE PLUS FRZ_OUT. | |
| FRZ_CAN | NO | REQ | 3 | NO ORDER CANCELLATIONS OR DECREASES FOR ORDER CURRENTLY AT ORDER LOC WITHIN MIMIIN.PLANDATE AND FRZ_CAN. | |
| CAN_HORZ | NO | REQ | 3 | CANCEL (RATHER THAN RESCHEDULE OR ALTER) ALL ORDERS DUE AT ORDERING LOC BEYOND MIMIIN.PLANDATE PLUS CAN_HORZ | |
| MIN_RES_IN | NO | REQ | 3 | MINIMUM# DAYS AN ORDER NEEDS TO BE MOVED IN BEFORE WE WILL BOTHER CHANGING THE RECOMMENDED DATE | |
| MIN_RES_OUT | NO | REQ | 3 | MINIMUM # DAYS AN ORDER NEEDS TO BE MOVED OUT BEFORE WE WILL BOTHER CHANGING THE RECOMMENDED DATE. | |

REGENERATIVE AVAILABLE TO PROMISE

RELATED APPLICATION

This present invention is related to U.S. patent application Ser. No. 08/926,131 entitled "Best Can Do Matching of Assets with Demand in Microelectronics Manufacturing" to Dangat et al., filed Sep. 9, 1997 and to U.S. patent application Ser. No. 09/225,130 entitled "Single Level Bill of Material Available to Promise", to Dangat et al. filed coincident herewith, both assigned to the assignee of the present invention and, both incorporated herein by reference.

Background of the Invention

1. Field of the Invention

The present invention generally relates to computer implemented planning resources and decision support tools and, more particularly, to a tool in which production planning information is used to match assets to demands.

2. Background Description

In a complex manufacturing environment such as semiconductor manufacturing, it is very difficult to predict the availability of components/parts. Currently existing planning tools used for predicting availability include spreadsheets and manual calculations. Most planners use a spreadsheet to combine supply and demand information for managing parts and components, and for making reasonably accurate product forecasts.

However, at each production stage, there may be several byproducts or production options that complicate the whole manufacturing scenario. So, in addition to which option to select, product planners must consider which byproduct might be produced. Tracking all projected information receipts with a spreadsheet, while simultaneously attempting to minimize byproduct manufacture is both time consuming and very likely, not very accurate. Further, manually doing the same task is even more difficult. Thus, regardless of which prior art method used, it is nearly impossible to achieve an optimum solution.

Further, most current tools use calculator like logic to predict part availability for each individual time period. Typically, part availability is determined by subtracting Demand and Reservations from Total Supply. However, the total available supply either must be known or, projected supply must be entered, manually. Unfortunately, this data is not available, typically, and so, the above availability check yields a zero result. Thus, due to lack of data, these simple tools cannot give a projected delivery date.

So, to project part availability dates, more advanced, state of the art tools either use part production cycle time for projections or, rely on historic information. Still, in a large and complex manufacturing environment, these state of the art tools fall short, resulting either in a sub-optimal solution or predicting an erroneous availability date.

Figure 1:
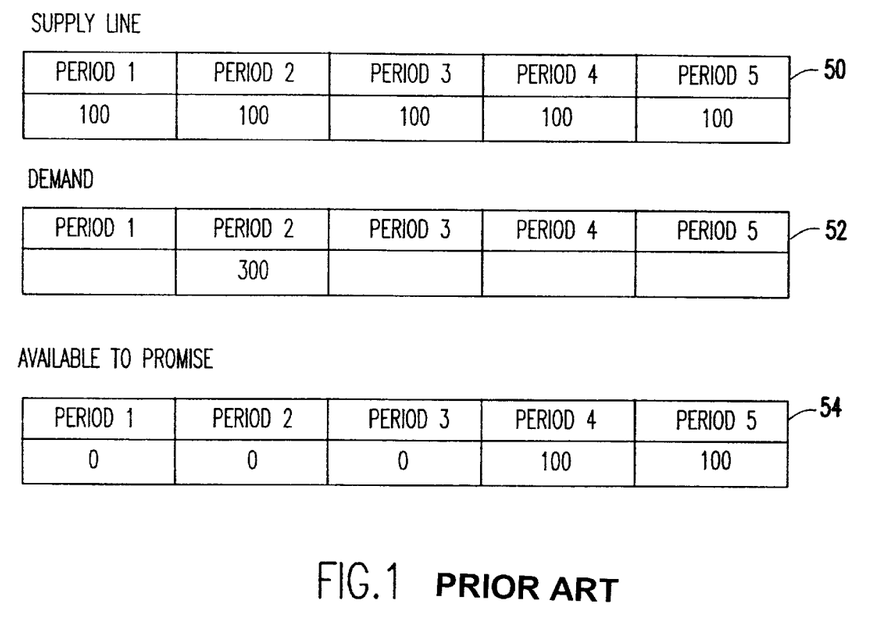
FIG. 1 is an example of supply allocation on a typical traditional prior art availability system.

The tables of FIG. 1 show a simple behavioral example of a typical traditional prior art availability system. The system of the example of FIG. 1 includes a table 50 for supply, a table 52 for demand and a table 54 indicating excess capacity, i.e., the capacity available to promise (ATP). From supply table 50, 100 pieces are produced during each production period, e.g., every day. From demand table 52, there is a firm order in Period 2 of 300 pieces. Thus, the supply from Period 1, Period 2 and Period 3 are dedicated to satisfy that firm order of 300 pieces. So, the ATP table 54 shows 100 pieces available in each of Period 4 and Period 5. Consequently, to respond to a new request, the best recommendation from this prior art system is to fill the new request with parts from Period 4 and/or Period 5.

This example of prior art availability allocation represents what is known as Demand Prioritization. The ATP quantity is determined by netting demand against supply. Thus, current demands are filled first from available supply with remaining excess supply being tagged as ATP, i.e., Available To Promise.

In traditional prior art ATP systems, all customers are treated equally and, new commitments are made on a first come first served basis. These prior art systems did not make distinctions between requests from a higher priority customers (e.g., tier 1) and lower priority customers (tier 3). Further, system users of these prior art systems did not have any capability of prioritizing demands, giving higher priority to higher tier customers' demand. Consequently, demand from lower tier customers could not be overridden by demands from higher tier customers.

Additionally, capacity could not be reserved for important customers on these prior art systems, which could not pre-allocate or reserve portions of output for a particular customer. Typically, for these prior art systems, order commitment was based on Supply Determination, i.e., determining supply coming to stock or, supply already available as inventory. The common prior art supply determination models are: Setting supply equal to the forecasted demand; and Basing end product availability on sub-components availability, i.e., those sub-components used in producing the product supplied.

Unfortunately, the disadvantage of the former method of basing supply on demand is that output or supply is based on a demand forecast and, therefore, is only as good as the forecast. The disadvantage of the latter method of basing supply availability on sub-component availability is that it results in myopic Inventory allocation, failing to take into account the business impact of each allocation.

A standard semiconductor industry practice called "Binning" makes this latter prior art method especially unsuitable for semiconductor manufacturing. Where manufacturing a part provides variations of the part due to normal manufacturing parameter variations, the parts may be sorted according into separately identified groups, e.g., fast parts, slow parts and normal parts. This is referred to as binning.

As a result of normally unpredictable manufacturing process variations, the number of parts falling into each "bin" varies from production lot to production lot. So, one lot may produce fewer fast parts and more normal parts than expected, while another lot may produce fewer than expected slow parts. Satisfying demand using binned subcomponents, for this latter ATP method, may use more sub-components than necessary. As a result, projected ATP is lower than what the enterprise is actually capable of producing.

In some instances shortfalls may be avoided where, for example faster parts may be substituted, transparently, for slower parts. Further, such substitutions may be time-dependent, i.e., based on business decisions, allowing, over time, changing or halting the substitution. Prior art ATP systems could not handle these on the fly decisions.

Furthermore, the manufacturer may resort to second sourcing or out sourcing for the same part. Also, alternate processes may be modeled to reflect alternate bills of material resulting in different sub-components, which these prior art ATP systems also cannot handle. Instead, these prior art ATP systems ignore manufacturing capacity and consider only sub-component availability.

Thus, basing commit orders on supply availability, prior art ATP systems require manual intervention, because these prior art systems are unable to recognize important customers and allocate supply, however limited, accordingly. Consequently the prior art ATP system user must compensate for prior art ATP system shortcomings.

For example, a customer order may have multiple delivery dates. The prior art ATP system user must decide whether to complete the order with supply available on each requested date; determine the latest date when the entire supply will be available and commit to that date; or, fill the order according to the schedule proposed by ATP system. The prior art ATP system user must make this decision for each individual order.

Another limitation of prior art ATP systems is that they are connected, generally, to a single ordering system, and are not capable of accepting orders from multiple lines. This lack of horizontal integration results in potential commit errors because all demands from other ordering system are not reflected in a single common ORDER BOOK. Consequently, there may be system downtime to periodically synchronize supply and demand as required in these prior art ATP systems. This synchronization is done, for example, using batch programs.

Another shortfall of these prior art ATP systems is that supply generation is not linked, explicitly, with demands and requests on hand. Consequently, very often this results in excess part supply with no demand, and with limited or no availability for high demand parts.

Thus, there is a need for an integrated ATP system capable receiving orders from multiple ordering systems, providing a scheduled date of when ordered material can be supplied and the quantity that can be supplied on that date in response to the customer's preselected requirements.

SUMMARY OF THE INVENTION

It is therefore a purpose of the present invention to provide an integrated tool for providing recommendations to users for what is Available to Promise;

It is another purpose of the present invention to provide a system that upon a customer request, provides a date when material can be supplied and quantity that can be supplied on that date;

It is yet another purpose of the present invention to provide recommendation to users for what is Available to Promise using the latest asset and demand picture;

It is yet another purpose of the present invention to avoid violating business rules of order acceptance while providing recommendations to users for what is Available to Promise;

It is yet another purpose of the present invention to provide recommendation to users for what is Available to Promise in a real-time multiprocessing environment, enabling multiple users to use the system simultaneously on multiple order entry systems.

The present invention is a computer implemented Availability Checking Tool enabling tool users to execute within a common work environment, from common enterprise data on a single level bill of material and the method of operating the tool. The preferred embodiment checking tool considers assets and demands across multiple order management systems and manufacturing facilities within boundaries established by manufacturing specifications and process flows and business policies. The tool permits tool users to easily maintain a synergistic relationship between multiple ordering systems. Customer business rule level definition are supported to provide the tool users with the power to micro-manage, optimally, enterprise assets and demands.

The preferred embodiment tool includes one or more demand sources for inputting demand information. A demand configurator coordinates product requests based on information from the demand source according to certain rules and priorities assigned to the product requests. A material resource engine manipulates data from the demand configurator and the rules to provide material supply information. A solver manipulates the material supply information from the resource engine and the rules to provide optimized product availability information.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
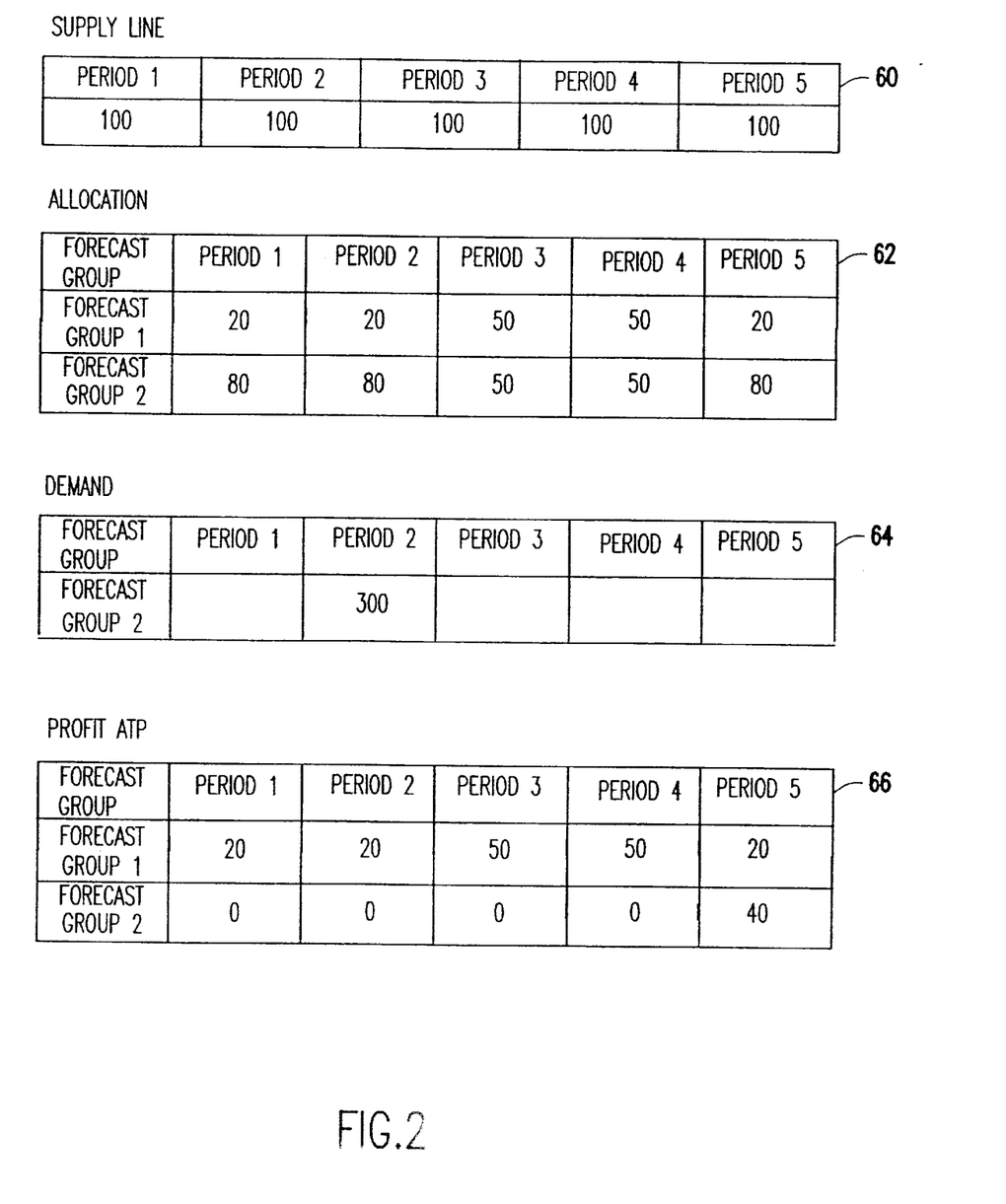
FIG. 2 is an example of supply allocation on a preferred embodiment available to promise (ATP) system.

Referring now to the drawings, and more particularly to FIG. 2, which is behavioral example of a preferred embodiment regenerative available to promise (ATP) system. This Example includes a table 60 for supply, a supply allocation table 62, a demand table 64, and a PROFIT ATP table 66.

As can be seen from supply table 60, periodic output, e.g., day by day, is 100 pieces. For the present invention, supply is allocated in allocation table 62 to user-defined forecast groups, e.g., Forecast Group1 (containing for example high priority tier 1 customers) and Forecast Group2 (containing lower priority tier 3 customers). From demand table 64, there is a firm order at hand for 300 pieces in Period 2 placed by Forecast Group2 customers. Thus, the forecast allocation in Period 1 (80), Period 2 (80), Period 3 (50), Period 4 (50) and Period 5 (80) is used to satisfy the firm order of 300 pieces for Forecast Group2.

What remains available to promise from the preferred embodiment PROFIT ATP system, as can be seen from PROFIT ATP table 66, is the allocation for Forecast Group1 and, the excess for Forecast Group2 in period 5, i.e., 20 pieces each in Periods 1 and 2, 50 pieces each in Periods 3, 4, and 5. Further, for Forecast Group2, 40 pieces are available to promise in Period 5. So, for customers making new-material requests, the best that the system can recommend is 40 pieces in Period 5 for a Forecast Group2 customer and, for a Forecast Group1 customer, 20 pieces in each of Periods 1 and 2 and, 50 pieces in each of Periods 3, 4 and 5.

As a result, the preferred embodiment of PROFIT ATP system clearly distinguishes between high tier customer orders and lower tier customer orders by allocating supply between Forecast Group1 and Forecast Group2. The supply allocated for Forecast Group1 is not available for orders from Forecast Group2 customers. By allocating supply by forecast group, the preferred embodiment PROFIT ATP enables reserving supply for important customers and, also, identifying or associating supply with a specific demand, improving supply allocation.

Preferably, the supplying plant, material, customer location, and shipping location are grouped as forecast groups. Customer orders are fulfilled such that they may each consume the available supply from the customer's own forecast group. Each forecast group may have more than one customer and is assigned a tier and rank. A particular forecast group's tier and rank determines that forecast group's importance with respect to other forecast groups.

Each forecast group has a set of business rules associated with it. The associated set of business rules determines how each customer's order is filled within the group. Thus, the inclusion of forecast groups allows PROFIT ATP to group customers based on geographical location and importance to the supplier's business.

Figure 3:
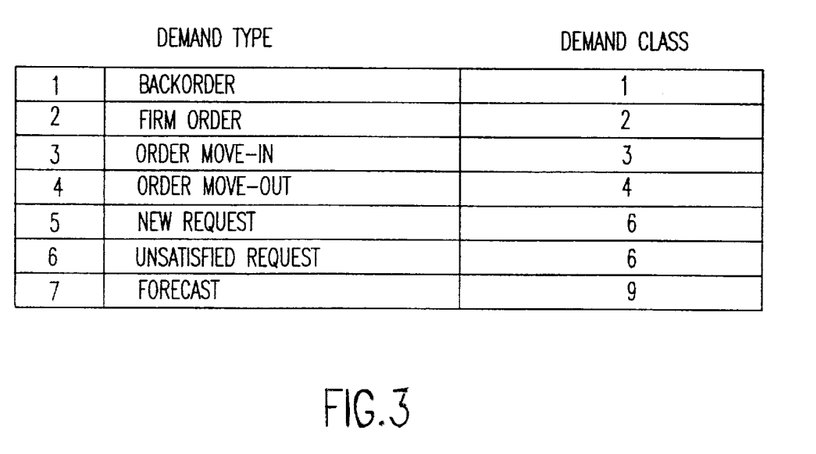
FIG. 3 is a Demand Class table for the preferred embodiment of the present invention, which allows customer orders to be prioritized and categorized.

In addition, orders provided to the preferred embodiment PROFIT ATP system include a Demand class, an example of which is provided by the table of FIG. 3. The order's demand class allows each customer order to be prioritized and categorized as a backorder, a firm orders, an order move-in, an order move-out, or a new requests. Having classified an order with its demand class, orders may be prioritized to determine which demand consumes assets, and the order in which the orders consume assets, based on date the order was committed.

In the preferred embodiment, the supply line, as represented in table 60, generated by a PROFIT BCD (Best Can Do) engine at the forecast group level. A configuration table associate the generated supply line with a demand class for each particular customer order. This association enables the preferred embodiment PROFIT ATP system to determine the supply available for each customer and, also, the type of order for which the supply was created, i.e., backorders, firm orders, order move-ins, order move-outs and new requests.

The preferred system of the present invention uses a PROFIT BCD engine 88 as described in U.S. patent application Ser. No. 08/926,131 entitled "Best Can Do Matching of Assets with Demand in Microelectronics Manufacturing" to Dangat et al., filed Sep. 9, 1997, refereed to hereinafter as "PROFIT BCD" assigned to the assignee of the present invention and incorporated herein by reference.

The PROFIT BCD engine matches each enterprise's assets, i.e., its output or supply, to the customer orders and, then, generates an optimized supply line based on customer, demand class and order commit date. The PROFIT BCD engine works within manufacturing specifications such as build options, BOM, yields, cycle times, receipt dates, capacity consumed, capacity available, substitutions, binning and shipping times. So, for the preferred embodiment of the present invention, the PROFIT BCD engine receives enterprise assets such as STARTS (starts required at the lowest level of bill of materials (BOM)), work in progress (WIP), inventory, purchases, capacity and, matches that input with existing and projected requests, i.e., demands provided by PROFIT ATP.

The PROFIT BCD engine automatically handles complex semiconductor industry issues such as binning, substitutions and alternate processes. Rules of substitutions and alternate processes can be user-specified and varied over time to handle day-to-day decision making. By handling these semiconductor industry issues, the PROFIT BCD engine eliminates problems that would otherwise occur such as vastly over-stated STARTS.

In the preferred embodiment of the present invention, customer orders (demands) are treated as inputs to the PROFIT BCD engine. These demands are manipulated to generate a supply line, e.g., table 60, at forecast group level. Each forecast group has supply allocated for it and determines which customers belonging to that group can consume the group's allocated supply. This allocation enables PROFIT ATP to reserve some output for important customers, to insure that lower priority customers do not consume the output set aside for those important customers. As a result, the preferred embodiment PROFIT ATP system is superior to prior art ATP systems, which constrained to allocating supply on a first come first served basis.

Further, the preferred embodiment PROFIT ATP system allocates supply according to user specified rules that are set up to handle each customer's delivery proposal requirements. These user specified rules guide the preferred embodiment PROFIT ATP system to decide, automatically, whether an order is completed from supply available on the requested date, if the order is committed on the last supply availability date, or, if the order is completed on different schedule dates proposed by the PROFIT ATP-system.

So, continuing the example of FIG. 2, if the preferred embodiment PROFIT ATP system receives a new request of 80 pieces in time Period 2 for a Forecast Group1 customer, based on customer requirement, the system may recommend: 40 pieces in time Period 2; 80 pieces in time Period 3; or, 40 pieces in time Period 2 and 40 pieces in time Period 3. Since supply is based on forecast group level, the preferred embodiment PROFIT ATP system automatically recognizes reservations for important customers. Thus, manual intervention is unnecessary to commit orders for a limited supply.

A preferred embodiment PROFIT ATP system is flexible, allowing ORDER BOOKS on multiple platforms to be linked in a single ATP process. Thus, as a result of this integration, the preferred embodiment ATP system receives and responds to demands in real-time. Further, preferred embodiment systems avoid downtime required for integrating demands from individual ordering systems otherwise incurred by prior art ATP systems.

Additionally, the supply generation process is explicitly linked with demands and requests on hand in the preferred embodiment PROFIT ATP system. Consequently, the PROFIT BCD engine system automatically recognizes demands (priorities assigned by demand class and date committed). So, parts for which there is little or no demand, this demand recognition enables the system to automatically reduce manufacturing and, instead, shift manufacturing resources to increase high demand part production.

Preferably, the present invention uses what is typically known as an online server on a Unix based machine, and more preferably AIX from IBM Corporation. Alternatively, other similar environments such Windows NT from Microsoft Corporation or Mainframe based systems may be suitable substitutes. Preferably, the online server system interfaces directly to the order-entry system (or systems) and maintains, what is typically referred to as a real time picture of the orders. The order-entry system(s) are tied to the server, referred to as the ATP server, using messaging middleware, preferably MQ series messaging middleware from IBM Corporation. The ATP recommendation is also passed back to the online order-entry system(s) using the MQ series messaging middleware.

Figure 4:
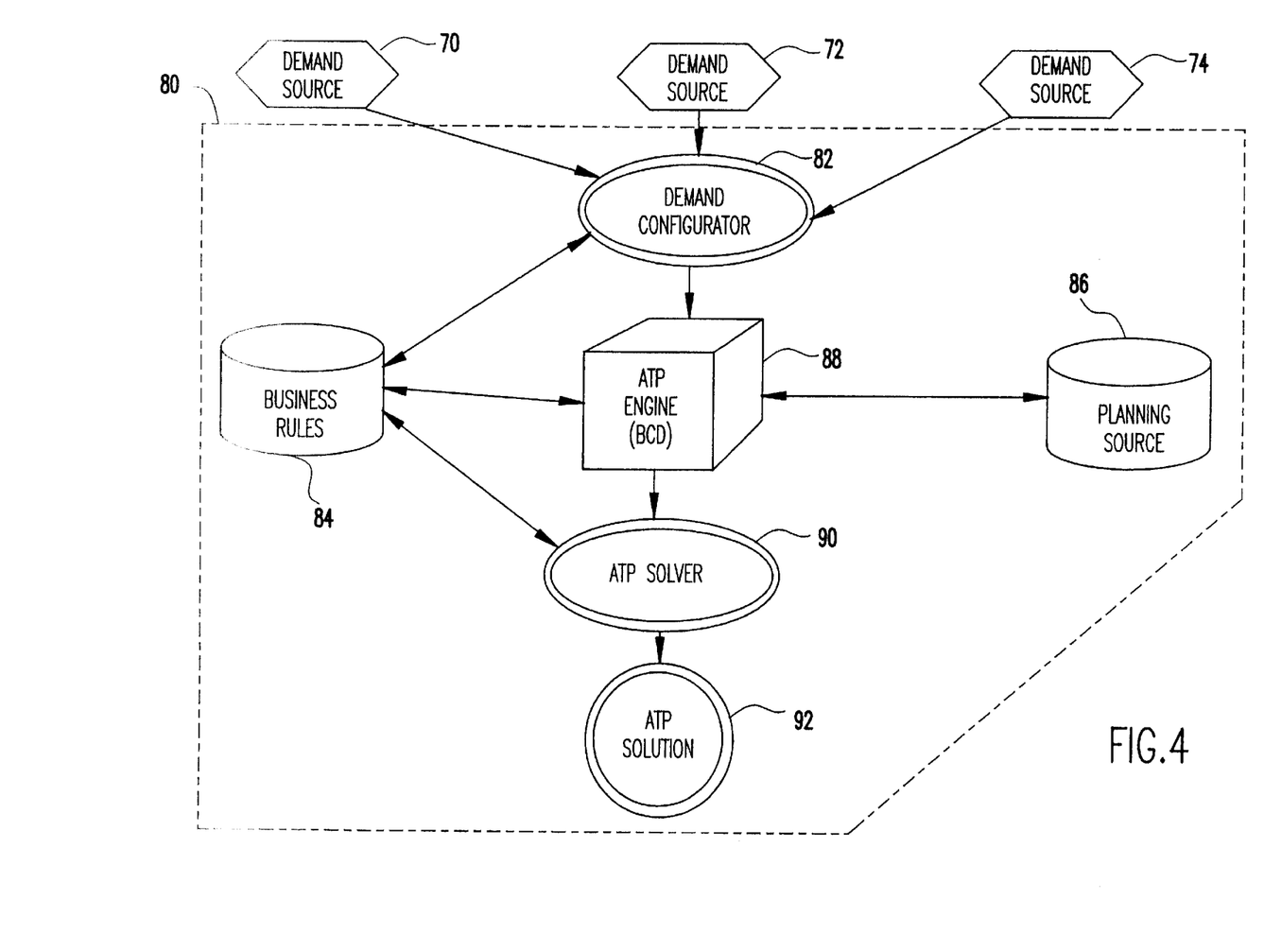
FIG. 4 is a block diagram of the preferred embodiment PROFIT ATP system.

FIG. 4 is an overview of the preferred embodiment ATP system of the present invention. Demand source boxes 70, 72 and 74 represent different order-entry sources connected to the PROFIT ATP system 80. Order-entry systems 70, 72 and 74 send new requests, order confirmation or order changes to the ATP system 80. These orders/requests are stored in a repository (not shown) called a Demand file.

Demand Configurator 82 processes customer orders (demands) according to predefined business rules 84. The business rules 84 are rules dictating how to handle customer orders based on the customer's importance to the user's business and, also, are rules for recommending to users how to fill those orders. Demand Configurator 82 ensures that the PROFIT ATP system can identify, prioritize and distribute the user's business assets according to pre-defined priorities such as customer importance.

Planning Source 86 passes manufacturing and planning related information necessary to the PROFIT engine (PROFIT BCD) 88. The output of ATP engine 88 and business rules 84 are passed to the ATP solver 90, to generate the ATP solution 92.

The preferred embodiment PROFIT BCD engine 88 provides a heuristic solution to adjust product STARTS for time and capacity feasibility. The PROFIT BCD engine 88 requires asset information about the enterprise, including planned STARTS (starts at the lowest level of the BOM), work in progress (WIP), inventory, purchases and both tooling and manpower capacity. The enterprise demands include firm orders, forecasted orders, and inventory buffer. The PROFIT BCD engine 88 manages the enterprise assets against demands using manufacturing guidelines and specifications. These specifications are available as build options (BLDOPT), bill of materials (BOM), yields, cycle times, receipt dates, capacity consumed, capacity available, substitutions (allowable substitutions), binning or sorting, and shipping times.

The planning source 86 receives current PRFTIN (Profit Input) files to drive the PROFIT ATP engine 88. These current PRFTIN files include build options (BLDOPT), bill of materials (BOM), inventory data (INV), inventory policy (INVCOST), new effective plan date (PLANDATE), part number detail (PND), receipts (RECPT), yields (YLD), capacity available (CAPAVAIL), capacity required (CAPREQ), substitutions (SUB), binning (BIN), and DEMAND (DEM) files. This informaiton used to drive the planning and manufacturing activities is also used for order-comit. Thus, the preferred embodiment PROFIT ATP system provides superior recommendation to those from prior art systems because the preferred embodiment recommendations are much more realistic and much more accurate.

The PROFIT ATP 88 generates a customer level supply line in the supply table. So, the actual supply may be mapped against actual demand because the supply line is also associated with demand classes that relate the importance of the demand to the business. By taking advantage of this mapping feature of the PROFIT ATP engine 88, demand priorities are set based on user/business requirements simultaneously with mapping supply to actual demand. Thus, preferred embodiment PROFIT ATP system users may group customers by forecast group and, thereby, generate supply availability at the forecast group level.

Figure 5:
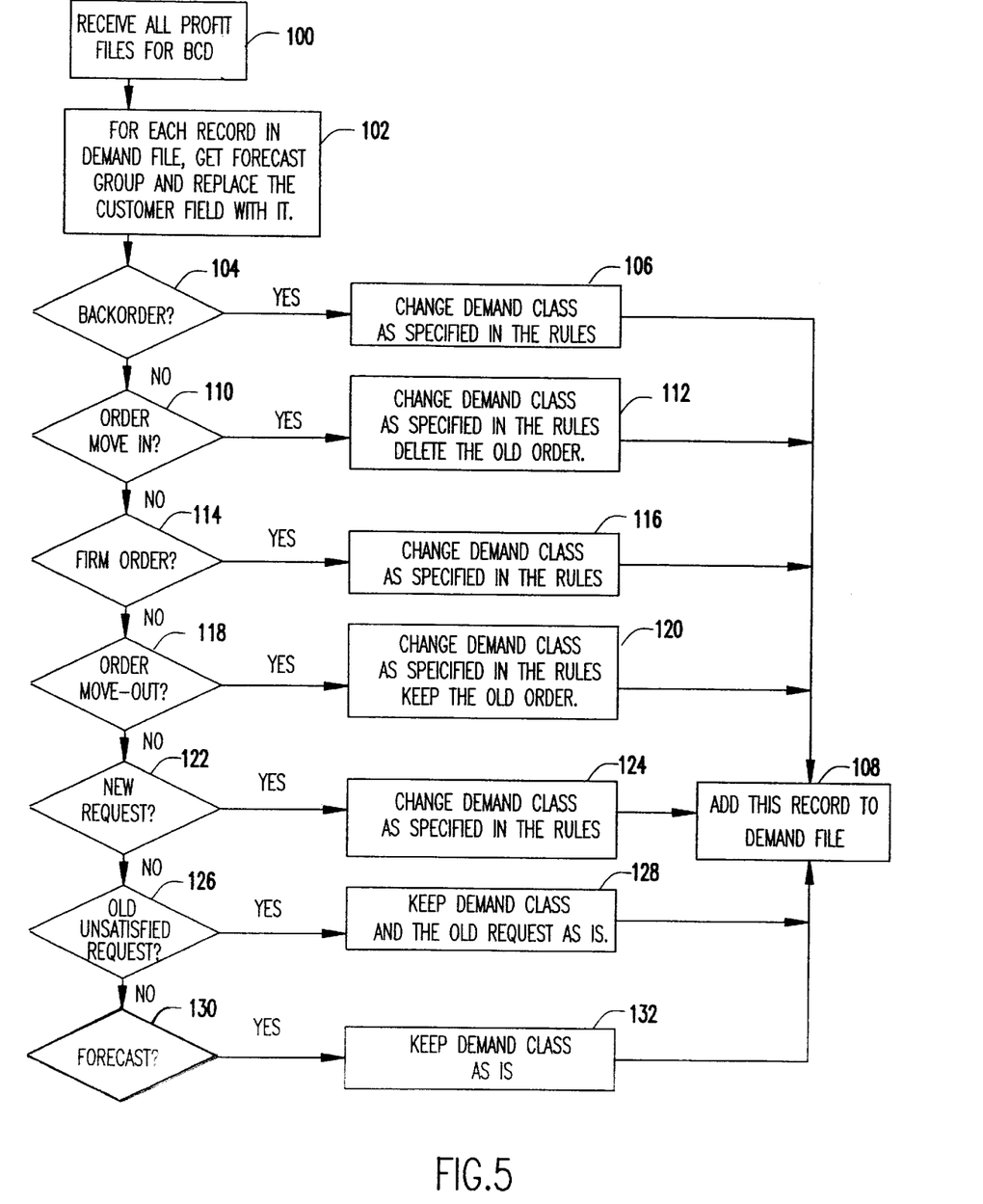
FIG. 5 shows the method executed by the Demand Configurator of configuring demands according to the importance of the orders to the business.

FIG. 5 is a block diagram of the Demand Configuration process executed by Demand Configurator 82. For the Demand Configuration process, demands from all order-entry sources (70, 72 and 74) are collected into a demand file in step 100. An example of demand types and user-defined demand class values is provided in the table of FIG. 3.

Figure 6:
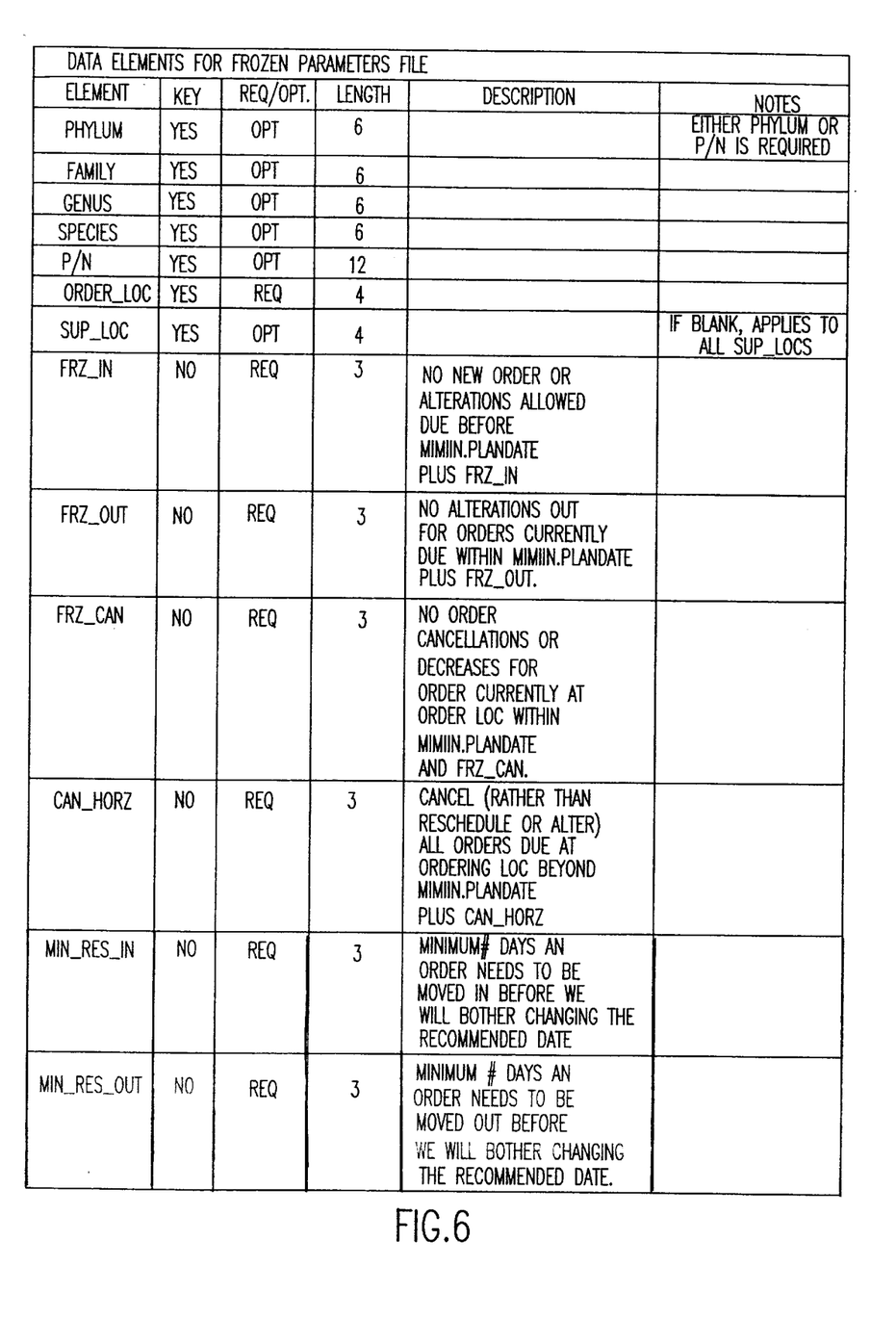
FIG. 6 shows an example of a PROFIT ATP frozen zone table.

So, then in step 102, for each individual demand record in the demand file:

1. The forecast group of the retrieved demand record is determined from the PROFIT ATP business rules table 84 by matching a supplying plant, material, customer location and shipping location.
2. If, in step 104, the demand record is identified as a backorder; then, in step 106, its demand class is modified to the value specified in the PROFIT ATP configuration table, i.e., a 1 in the example of the table of FIG. 3, and the modified record is passed to the Demand File in step 108. Otherwise it is passed to step 110 for further processing.
3. If in step 110, it is determined that the demand record is an order move-in, a frozen-zone, i.e., a period wherein supply allocations may not be changed, is found by matching the demand record's supplying plant and material with a PROFIT ATP frozen zone table, an example of which is provided in FIG. 6.
   If the demand's commit date is within the frozen-zone period, then the commit quantity of the demand is changed to zero and a error flag is set for the user to see the cause of rejection.
   If the demand's commit date is not in the frozen-zone, then in step 112, the old commitment for this demand is deleted from the demand file and is replaced by the current demand; the demand class is modified to the specified move-in value, 3 in this example; and, in step 108, this demand record is passed to the Demand File for subsequent processing.
Otherwise it is passed to step 114 for further processing.
4. In step 114, a determination is made whether the demand record is a firm order and, if so, in step 116 its demand class is set to a corresponding firm order value, 2 in this example; then, in step 108, this modified demand record is passed to the Demand File for subsequent processing.
Otherwise it is passed to step 118 for further processing.
   If, in step 118, it is determined that the demand record is an order move-out, again, in step 120, the frozen-zone is found by matching the demand's supplying plant and material with the PROFIT ATP frozen zone table.
   If the demand's request date is within the frozen-zone period, then the commit quantity of the demand is changed to zero and a error flag is set for the user to see the cause of rejection.
   If the demand's request date is not in the frozen-zone, the old commitment for this demand is deleted from the demand file and is replaced by the current demand and the demand class is modified to the specified move-out value, 4 in this example; then, in step 108, this demand record is passed to the Demand File for subsequent processing.
Otherwise it is passed to step 122 for further processing.
6. If in step 122, it is determined that the demand record is a new request, then in step 124, the demand class is modified to the specified new request value, 6 in this example; then, in step 108, this demand record is passed to the Demand File for subsequent processing. Otherwise it is passed to step 126 for further processing.
7. If, in step 126, the demand is determined to be an old unsatisfied request, then, in step 128, the demand is passed unmodified, i.e., the demand class remains unchanged at 6 in this example, and added to the Demand File in step 108 for subsequent processing. Otherwise it is passed to step 130 for further processing.

8. If, in step 130, the demand is determined to be a forecast, then, in step 132, the demand class is left at the specified forecast value, 9 in this example, and added to the Demand File in step 108 for subsequent processing.

Thus, for the example using the table of FIG. 3, a back order has the highest priority, higher than a firm order, a new request or a forecast. Similarly, a firm order has higher priority than an order change, a new request or a forecast. Assigning a higher demand class allows such demands to be given higher priority when processed by the PROFIT ATP engine 88, thereby ensuring that the business, i.e., the user, meets its commitments. Thus, demand configuration is an important element of the preferred embodiment regenerative run. The demand configuration is important because it enables the preferred PROFIT ATP engine 88 to drive manufacturing, keeping commitments and recommending proposals for new requests based on the enterprise's current demand picture without being paused for human intervention.

The PROFIT ATP Engine 88, i.e., PROFIT BCD, determines what can be built and when. So, the preferred embodiment PROFIT ATP system determines both what can be built, optimally, and, whether to accept orders.

The PROFIT ATP engine 88 retrieves from planning source 86 any necessary manufacturing data. This manufacturing data is shared with planning tools that drive the manufacturing processes. The demand classes of each demand/order are set according to the needs of the particular business enterprise which by presetting demand preference have preselected the demand's importance. The preferred embodiment PROFIT ATP system 80 uses the most current demands with their most current associate demands with their most current associate classes from the demand configurator 82.

Thus, the first step in the preferred embodiment regenerative ATP check is running the PROFIT work-in-process (WIP) projection tool on Capacity Available (CAPAVAIL), Capacity Required (CAPREQ) and Receipt (RECPT) files. After processing these files the WIP projection tool's output is placed in the Planning Source 86. Then, that output, stored in the planning source 86, is used by the preferred PROFIT ATP system instead of the actual CAPAVALL, CAPREQ and RECTP files. The PROFIT ATP engine 88 applies the PRFIT BCD heuristic to the output data in the Planning Source 86, including both files modified by WIP projection tool and the configured demands, configured based on user-defined forecast groups and demand class.

As a result, because PROFIT BCD is the preferred PROFIT ATP engine 88, the regenerative check is done using the same solver planners used to drive the enterprises manufacturing process. Thus, the preferred embodiment solver generates a best can do match between existing assets and demands. Further, this match is across multiple facilities and based on manufacturing specifications, process flows, business policies and preset guidelines. Therefore, manufacturing can ensure meeting delivery commitments in a timely fashion providing a superior solution to prior art systems.

Because of improved reporting and projection accuracy, the preferred embodiment system avoids over building of binned parts and, therefore, minimizes the number of starts typically required for the binned part. Further, if end component demand is satisfied using binned sub-components, the preferred ATP engine 88 prevents sub-component manufacture beyond what is actually required.

So, in the semiconductor industries, where equivalent parts may be substituted at appropriate times, the preferred PROFIT ATP engine 88 automatically makes such substitutions directed by user based business decisions and in user defined time-periods. Furthermore, where two or more alternate processes can produce the same part, the preferred PROFIT ATP engine 88 automatically selects one process in response to a user's business decision, for example, to out-source certain operations during selected time-periods because of economic or capacity considerations. Thus, the preferred embodiment of the present invention allows on-the-fly substitutions, not previously available with prior art ATP systems. Accordingly, the preferred embodiment PROFIT ATP system has several advantages over prior art ATP systems.

So, after a new customer order is received and processed through the PROFIT ATP engine 88, what can be built and when, which is the output of the PROFIT ATP engine 88, is passed to ATP Solver 90. The ATP Solver 90 processes that output according to the flow diagram of FIG. 7, determining how to meet the order from uncommitted supply.

Figure 7:
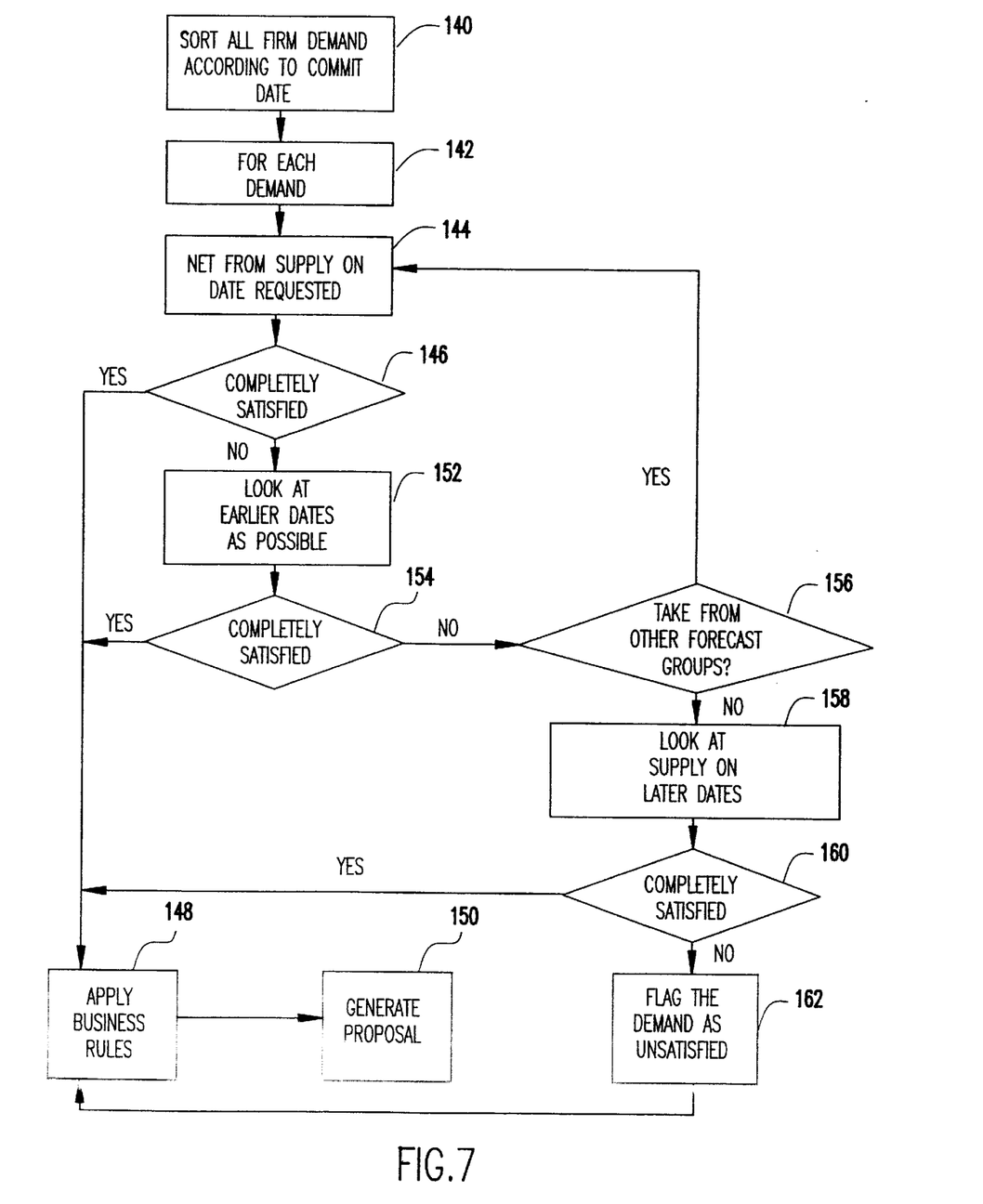
FIG. 7 shows the netting method followed by the preferred embodiment PROFIT ATP system.

To determine an optimum solution, the ATP solver 90 processes a new order from a customer, first by summing all firm demands (i.e., back orders, firm orders, order move-ins, order move-outs) and reservations for the material requested. Then, the total supply is reduced accordingly. This process, referred to as netting out, determines unallocated (free) supply available to fulfill (net out) the customer's new request.

So, in step 140, all firm demands in the demand file are sorted according to supplying plant, material, commit date, tier and rank. Also, all of the supply generated by the PROFIT ATP engine 88 is sorted according to its supplying plant, material, forecast group and date. Then, the total currently available supply is determined by reducing the total generated supply by the amount committed to all firm demands for the material or product requested in the order.

In a preferred embodiment system, the new order is netted out from supply identified for the customer, first from currently available supply, supply for the current and, then, prior periods. If more supply is still required, other customers' currently available supply is used to fill the order, i.e., from other customers with the same or lower priority. Again if the order still has not been filled, anticipated or future supply, supply to be produced and designated for the ordering customer or for customers with the same or lower priority, is made available to fill the order. In the preferred embodiment, if earlier supply and/or future supply are required, available supply from time periods closest to the current time period is allocated first.

Thus, in step 142, firm demands are selected for processing, individually. In step 144, the individually selected demand's forecast group is obtained from the PROFIT ATP rules table in the Business Rules 84. Currently available supply, committed to that forecast group is allocated from the current period. If in step 146, the order has been satisfied, then in step 146, the order has been satisfied, then in step 148 the business rules are applied and a proposal is generated in step 150.

If in step 146, the order has still not been filled, then, in step 152, supply from earlier periods is made available and allocated in reverse chronological order, most recently available supply followed by older. After allocating supply from each period, the result is checked in step 154 to determine if the order is met. If, in step 154, it is determined that the order has been satisfied, then in step 148, the Business Rules 84 are applied to the ATP response, a proposal is generated and the proposed result is passed to ATP Solution 92 in step 150.

If, however, it is determined in step 154 that current supply is insufficient to meet the order, then, in step 156, the supply available to fill the order is supplemented from other, lower tier, forecast groups currently available supply. So, after determining that supply, previously designated for other forecast groups of the same or lower priority is currently available, that previously designated supply is made available and allocated, as needed, according to steps 144–154. Again, the newly available supply is allocated in reverse chronological order, first in steps 144 and 146 from supply for the current period, followed if necessary in steps 152 and 154 by supply from prior periods, most recently available supply followed by older. If, in step 154, this additional supply from the lower tier forecast groups still does not satisfy the order; then, in step 156, more supply is made available from whatever remaining supply is designated for other lower tier forecast groups.

Once it is determined, in step 156, that all of the currently available supply for the lower tier forecast groups has been exhausted and the order is still unfilled (determined in step 154), then, in step 158, the supply is further supplemented with uncommitted future supply from future periods. The future supply is allocated first, from the ordering forecast group's supply in ascending chronological order. If the future supply for the forecast group placing the order is still insufficient to satisfy the shortfall, then, the supply is further supplemented with uncommitted future supply from forecast groups with the same or lower priority, again in ascending chronological order. Once it is determined, in step 160, that the order has been satisfied, then, in step 148, the Business Rules 84 are applied to the ATP response, a proposal is generated and the proposed result is passed to ATP Solution 92 in step 150.

If all supply, both currently available and future, for all same tier and lower tier forecast groups is allocated and the order remains unsatisfied in step 160, then, in step 162, the order is flagged (identified) as unsatisfied. The Business Rules 84 are applied to the flagged demand and, in step 150, a proposal is generated. The proposed result is passed to ATP Solution 92.

Next, the solver nets out the reservations (i.e., orders from a lower tier forecast group than the firm orders) from remaining supply. First, all of the reservations in the reservation file are sorted according to supplying plant, material, commit date, tier and rank. Then, the balance of supply is used to net out all reservations for the requested material using the same method in FIG. 7 as described for netting out firm demands.

New requests coming into the preferred embodiment PROFIT ATP system are categorized either as an order move-in, an order move-out or, a new order. Periods are identified as frozen-zone periods for new requests with specific combinations of supplying plant and part number. If the new request is an order move-in or order move-out within an identified frozen zone period; then, prior old commitments for the order are held unchanged, the new request is flagged as an error and, the sending system is informed of the error. If, however, the order move-in or order move-out is beyond the frozen-zone period; then, the prior old commitment is replaced and treated as a new order.

New orders are processed, first by retrieving the new order's forecast group from the PROFIT ATP rules table. As with back orders, firm orders, order move ins and order move outs, the preferred embodiment PROFIT ATP tool consumes the least significant resource first, for each forecast group using substantially the same steps in FIG. 7 as used for higher priority orders. After a new request is met, the quantity, netted from supply, and the supply dates are stored as prospective order commit quantities and commit dates. Then, the next new order is processed until all new orders have been processed.

Finally, in the preferred embodiment tool, the ATP Solver 90 provides an ATP solution 92. In providing that ATP solution, in addition to recommending possible order fulfillment dates, the preferred embodiment PROFIT ATP system provides recommendations based on user-defined rules, as each individual customer desires. The preferred embodiment PROFIT ATP Solver 90 tunes its recommendations to individual customer requirements according to the enterprise's business rules 84.

To avoid repacking supply, for example, the business rules 84 can restrict supplied quantities to being multiples of a predetermined minimum shipping quantity (MSQ) for each material. In this example, the solution from the preferred embodiment PROFIT ATP system may recommend delaying orders until shipping quantities reach MSQ levels, ignoring the availability of partial quantities prior to the recommended date.

As provided hereinabove, the business rules 84 include customer requirements and enterprise order commitment policies. Both of these requirements or, rules are defined in a table in the Business Rules 84 in the preferred embodiment PROFIT ATP tool. By including both of these business and customer requirements in determining the solution, manual intervention is unnecessary, unlike traditional ATP systems for order fulfillment, which normally require such manual intervention.

Further, requested material, netted from total supply, is made available as the request can be filled. The business rules are applied to these prospective proposal quantities and dates to generate a ATP proposal as follows:

First, all proposal dates prior to the request date are moved to the requested date and all quantities corresponding to those dates are accumulated as being available at that date. It should be noted that, even though material may be available prior to the request date, it cannot be shipped until the requested date or thereafter.

Next, if the ATP Solution 92 is for an existing order (move-in); then, the preferred embodiment PROFIT ATP system ensures that order move-ins do not have commitment dates later than the order's original commit date. So, if, on the proposed solution date, the proposed solution provides for a smaller quantity either for existing commitments already in the demand file or for a new request; then, the proposed solution date is pushed back, order date by order date, until the proposed commit date is later than the existing order's original commit date. If, however, the proposed commit date is later than the existing order's original commit date; then, proposed commit date is changed to the existing order's original commit date.

Otherwise, if the ATP solution is for a new request; then, the preferred embodiment PROFIT ATP system completes the order recommendation based on customer preferences, as provided from the PROFIT ATP rules table. Customer preferences of order commitment is represented as two digit number greater than or equal to 01 and stored in the PROFIT ATP rules table.

So, for example, if the stored value is 01, then, the preferred embodiment PROFIT ATP system recommends the available quantity on the requested date. The request may be fully or, partially satisfied from this recommended quantity. All quantities from subsequent proposal dates are, then, freed for subsequent orders. Next, the supply is reserved for the ordering customer by making an entry in the Reservation File for the actual, committed quantity and date. This reservation is held until receipt of customer approval, or, upon expiration of a customer defined reservation time stored in the ATP rules table.

However, if the stored value is 02; then, for this example, the preferred embodiment PROFIT ATP system again recommends the available quantity on the requested date. The available quantity may fully or, only partially, satisfy the request. All other proposed dates and quantities, subsequent to the requested date are stored as soft reservations, internally, in the Reservation File. Next, the preferred PROFIT ATP system sends electronic mail (e-mail) informing the designated material owner of soft reservations being held against the order. The soft reservations are set to expire coincident with the actual request reservation.

If the stored value is 03, in his example the preferred embodiment PROFIT ATP system recommends the last date that the order can be completed. The request may be fully or partially satisfied on this recommended date or, alternately, a the customer may select a later date. The actual committed quantity and its commitment date are entered in the Reservation File.

However, if instead of being greater than 01, the stored value is 00; then, the preferred embodiment PROFIT ATP system determines from the PROFIT ATP rules table whether the customer can accept the order in multiple deliveries. If so, then multiple dates with corresponding proposed quantities are recommended. If, however, multiple deliveries are not acceptable, then, only the quantity available on the requested date is recommended. Again, this available quantity may only partially satisfy the request, with a recommendation of additional supply from a later date to satisfy the remain unsatisfied portion. Whichever proposal is accepted, the committed quantity and its committal date are entered in the Reservation File.

While the invention has been described in terms of preferred embodiments, those skilled in the art will recognize that the invention can be practiced with modification within the spirit and scope of the appended claims.

We claim:

1. A system for determining product availability, comprising:
    a) at least one demand source inputting demand information;
    b) a demand configurator receiving demand information from each said at least one demand source and coordinating product requests responsive to said received demand information according to customer request rules and priorities;
    c) a material resource engine providing material supply information responsive to supply data, said received demand information and according to product supply rules and priorities; and
    d) a solver optimizing product availability information responsive to the material supply information and product supply rules and priorities,
    wherein the demand configurator determines how supply is grouped for a plurality of customers in a plurality of forecast groups,
    wherein the demand configurator comprises:
        means for retrieving all said received demand information;
        means for individually selecting orders from said all received demand information,
        means for mapping currently available supply against demand for each of said individually selected orders; and
        means for changing a demand class of each individually selected of said orders,
        said demand class indicates whether an order is a backorder, a firm order, an order move-in, an order move-out or a new request.

2. The system of claim 1, further comprising:
    means for storing said received demand information and said individually selected orders.

3. A system for determining product availability, comprising:
    a) at least one demand source inputting demand information;
    b) a demand configurator receiving demand information from each said at least one demand source and coordinating product requests responsive to said received demand information according to customer request rules and priorities;
    c) a material resource engine providing material supply information responsive to supply data, said received demand information and according to product supply rules and priorities; and
    d) a solver optimizing product availability information responsive to the material supply information and product supply rules and priorities,
    wherein the demand configurator determines how supply is grouped for a plurality of customers in a plurality of forecast groups,
    wherein the solver comprises:
        means for sorting said received demand information;
        means for individually selecting orders from said sorted demand information;
        means for netting supply for individually selected said orders;
        means for applying business rules against netted said supply;
        means for reallocating previously designated supply as currently available supply; and
        means for reallocating previously designated anticipated supply as available supply and treating said available supply as currently available supply.

4. A computer implemented method for determining product availability comprising the steps of:
    a) receiving demand information from one or more demand source;
    b) coordinating product requests responsive to said received demand information according to customer request rules and priorities;
    c) providing material supply information responsive to manufacturing and planning data from a planning source, said received demand information, and product supply rules and priorities; and
    d) optimizing product availability information responsive to the material supply information and product supply rules and priorities.

5. The computer implemented method of claim 4, wherein the step of coordinating request, each order is assigned a demand type corresponding to one of plurality of demand classes.

6. The computer implemented method of claim 5, wherein said plurality of demand classes comprises backorders, firm orders, order move-ins, order move-outs and new requests.

7. The computer implemented method of claim 5, wherein the step of coordinating requests, each order is assigned a demand type corresponding to one of a plurality of demand classes.

8. The computer implemented method of claim 7, wherein currently available supply for a particular customer group is designated as currently available supply for a plurality of demand types.

9. A computer implemented method for determining product availability comprising the steps of:
   a) receiving demand information from one or more demand source;
   b) coordinating product requests responsive to said received demand information according to customer request rules and priorities;
   c) providing material supply information responsive to manufacturing and planning data from a planning source, said received demand information, and product supply rules and priorities; and
   d) optimizing product availability information responsive to the material supply information and product supply rules and priorities,
   wherein in the step of coordinating requests, each order is assigned a demand type corresponding to one of a plurality of demand classes,
   wherein in the step of optimizing product availability, currently available product is allocated for a plurality of customers in a plurality of forecast groups,
   wherein currently available supply for a particular customer group is designated as currently available supply for a plurality of demand types,
   wherein anticipated supply for a particular customer group is designated as available supply.

10. The computer implemented method of claim 9, wherein anticipated supply for a particular customer group is designated as available supply for a plurality of demand types.

11. A computer program product comprising:
   a computer usable medium having computer readable program code embodied in said medium for determining product availability, said computer program product having:
      a) first computer program code for receiving demand information from one or more demand source;
      b) second computer program code for coordinating product requests responsive to said received demand information according to customer request rules and priorities;
      c) third computer program code for providing material supply information responsive to manufacturing and planning data from a planning source, said received demand information, and, further responsive to product supply rules and priorities; and
      d) fourth computer program code for optimizing product availability information responsive to the material supply information and product supply rules and priorities.

12. The computer program product of claim 11, wherein in the second computer program code of coordinating requests, each order is assigned a demand type corresponding to one of a plurality of demand classes.

13. A computer program product comprising:
   a computer usable medium having computer readable program code embodied in said medium for determining product availability, said computer program product having:
      a) first computer program code for receiving demand information from one or more demand source;
      b) second computer program code for coordinating product requests responsive to said received demand information according to customer request rules and priorities;
      c) third computer program code for providing material supply information responsive to manufacturing and planning data from a planning source, said received demand information, and product supply rules and priorities; and
      d) fourth computer program code for optimizing product availability information responsive to the material supply information and product supply rules and priorities,
   wherein in the second computer program code of coordinating requests, each order is assigned a demand type corresponding to one of a plurality of demand classes,
   wherein said plurality of demand classes in the second computer program code comprises backorders, firm orders, order move-ins, order move-outs and new requests.

14. The computer program product of claim 12, wherein in the fourth computer program code of optimizing product availability, currently available product is allocated for a plurality of customers in a plurality of forecast groups.

15. The computer program product of claim 14, wherein currently available supply for a particular customer group is designated as currently available supply for a plurality of demand types by the fourth computer program code.

16. A computer program product comprising:
   a computer usable medium having computer readable program code embodied in said medium for determining product availability, said computer program product having:
      a) first computer program code for receiving demand information from one or more demand source;
      b) second computer program code for coordinating product requests responsive to said received demand information according to customer request rules and priorities;
      c) third computer program code for providing material supply information responsive to manufacturing and planning data from a planning source, said received demand information, and product supply rules and priorities; and
      d) fourth computer program code for optimizing product availability information responsive to the material supply information and product supply rules and priorities,
   wherein in the second computer program code of coordinating requests, each order is assigned a demand type corresponding to one of a plurality of demand classes,
   wherein in the fourth computer program code of optimizing product availability, currently available product is allocated for a plurality of customers in a plurality of forecast groups,
   wherein currently available supply for a particular customer group is designated as currently available supply for a plurality of demand types by the fourth computer program code,
   wherein anticipated supply for a particular customer group is designated as available supply by the fourth computer program code.

17. The computer program product of claim 16, wherein anticipated supply for a particular customer group is designated as available supply for a plurality of demand types by the fourth computer program code.

* * * * *